(12) United States Patent
Park

(10) Patent No.: US 6,212,364 B1
(45) Date of Patent: Apr. 3, 2001

(54) REVERSE POWER CONTROL DEVICE AND METHOD FOR REDUCING INTERFERENCE BETWEEN TERMINALS

(75) Inventor: Su-Won Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/126,454

(22) Filed: Jul. 30, 1998

(30) Foreign Application Priority Data

Jul. 30, 1997 (KR) .................................. 97-36263

(51) Int. Cl.[7] ............................ H04B 7/185; H04B 7/00; H04Q 7/20
(52) U.S. Cl. .............................. 455/69; 455/522
(58) Field of Search .................................. 370/252, 318, 370/336, 337, 347, 335, 342; 455/522, 517, 69

(56) References Cited

U.S. PATENT DOCUMENTS

| | | | |
|---|---|---|---|
| 4,639,914 | * 1/1987 | Winters | 455/69 |
| 5,001,776 | * 3/1991 | Clark | 455/522 |
| 5,056,109 | * 10/1991 | Gilhousen et al. | 455/69 |
| 5,383,219 | * 1/1995 | Wheatley, III et al. | 370/342 |
| 5,455,967 | * 10/1995 | Amezawa et al. | 455/69 |
| 5,475,861 | * 12/1995 | Hall | 455/522 |
| 5,566,165 | * 10/1996 | Sawahashi et al. | 370/342 |
| 5,574,983 | * 11/1996 | Douzono et al. | 455/69 |
| 5,603,096 | * 2/1997 | Gilhousen et al. | 455/69 |
| 5,604,730 | * 2/1997 | Tiedemann, Jr. | 370/252 |
| 5,655,220 | * 8/1997 | Weiland et al. | 455/69 |
| 5,727,033 | * 3/1998 | Weaver et al. | 455/69 |
| 5,806,003 | * 9/1998 | Jolma et al. | 455/522 |
| 5,839,056 | * 11/1998 | Hakkinen | 455/69 |
| 5,878,350 | * 3/1999 | Nakamura et al. | 455/442 |
| 5,924,043 | * 7/1999 | Takano | 455/522 |
| 5,926,747 | * 7/1999 | Komara et al. | 455/522 |
| 5,991,636 | * 11/1999 | Won et al. | 455/522 |
| 6,028,894 | * 2/2000 | Oishi et al. | 375/227 |

\* cited by examiner

Primary Examiner—Melvin Marcelo
Assistant Examiner—Phuongchau Ba Nguyen
(74) Attorney, Agent, or Firm—Dilworth & Barrese, LLP

(57) ABSTRACT

A reverse power control method allows a base station to control transmission power of terminals. To this end, the base station sets a threshold value for the reverse power control, determines the number of the terminals requiring an increase in the transmission power and compares the determined number with the threshold value. If the determined number is equal to or greater than the threshold value, the base station commands the terminals to reduce the transmission power. However, if the determined number is smaller than the threshold value, the base station commands the terminals to increase the transmission power.

11 Claims, 4 Drawing Sheets

REVERSE POWER CONTROL DEVICE AND METHOD FOR REDUCING INTERFERENCE BETWEEN TERMINALS

BACKGROUND OF THE INVENTION

1. Field of the Invention

The present invention relates to power control of a spread spectrum communication system, and more particularly, to a reverse power control device and method for reducing interference between terminals, in which a base station controls transmission power of terminals.

2. Description of the Related Art

In a spread spectrum communication system, a base station compares transmission power of terminals with a threshold value, to command the terminals to reduce the transmission power if it is greater than the threshold value and otherwise command the terminals to increase the transmission power, so as to receive a signal with a desired strength. The reduction in the transmission power of one terminal leads to a reduction in interference with the other terminals.

Power control operation of a conventional CDMA (Code Division Multiple Access) communication system will be described hereinbelow. First, as to the reception operation of the base station, demodulators demodulate RF (Radio Frequency) signals received from the terminals. The demodulators may be composed of an RF demodulator for frequency shifting the received RF signal into the baseband signal and a baseband demodulator for demodulating the baseband signal into the original signal by despreading it. Signal power measurement parts measure the signal quality such as a received signal strength indicator (RSSI), a signal-to-interference ratio (SIR) and a bit error rate (BER) by analyzing the power of the signals output from the demodulators. Power control bit (PCB) generators generate power control bits according to the power measurement results.

Next, as to the transmission operation of the base station, PCB multiplexers multiplex the power control bits to the transmission signals output from baseband signal processors. RF modulators modulate the transmission signals with the power control bits output from the PCB multiplexers into the RF signals. A summer sums the transmission signals output from the RF modulators, and an RF signal processor converts the transmission signal output from the summer into the RF transmission signal.

However, an increase in the transmission power of one terminal by the above base station causes the increase in interference with the terminals, thus resulting in the deterioration of the signals. To compensate for the signal deterioration, the terminals need to increase the transmission power, which may cause vicious circle of the signal deterioration.

SUMMARY OF THE INVENTION

Accordingly, an object of the present invention is to provide a method for allowing a base station to control transmission power of terminals. The base station determines the number of the terminals requiring the increase in the transmission power and compares it with a threshold value. If the determined number is equal to or larger than the threshold value, the base station commands the terminals to decrease the transmission power, thereby reducing interference among the terminals.

To achieve the above object, there is provided a reverse power control method for allowing a base station to control transmission power of terminals in a mobile communication system. To the end, the base station sets a threshold value for the reverse power control, determines the number of the terminals requiring an increase in the transmission power and compares the determined channel number with the threshold value. If the determined number is equal to or greater than the threshold value, the base station commands the terminals to reduce the transmission power. However, if the determined number is smaller than the threshold value, the base station commands the terminals to increase the transmission power.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

In a mobile communication system, a base station measures the signal quality such as the RSSI, the SIR and the BER of the signals received from the respective terminals and increases transmission power of the terminals to enhance the signal quality if it is below a specified level. To do so, the base station commands the terminals to increase the transmission power by transmitting a power control bit to them. For example, the base station transmits the power control bit of "0" to command the terminal to increase the transmission power and the power control bit of "1" to command the terminal to reduce the transmission power. In accordance with the present invention, the base station determines the number of the terminals or the effective number of the channels requiring the increase in the transmission power and compares it with a threshold value. As a result, if the determined number is equal to or larger than the threshold value, the base station commands the corresponding terminals to decrease the transmission power, thus controlling the transmission power reversely. However, if the determined number is smaller than the threshold value, the base station commands the terminals to increase the transmission power in the existing manner.

Figure 1:
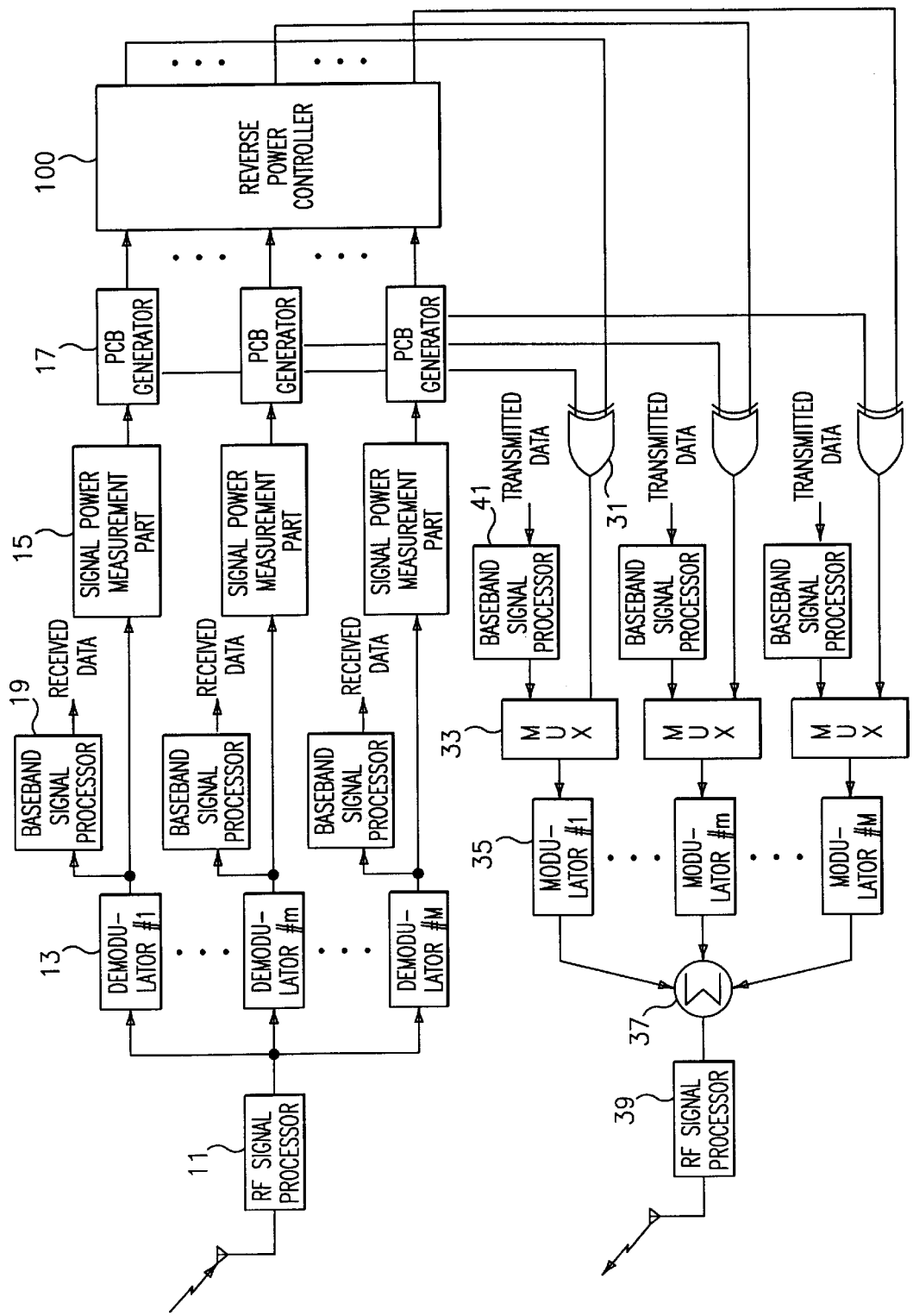
FIG. 1 is a block diagram illustrating a transmission power control device in a base station of a CDMA communication system according to an embodiment of the present invention.

FIG. 1 shows a power control device in the base station of the CDMA communication system according to an embodiment of the present invention. Referring to FIG. 1, demodulators 13 demodulate RF signals received from the terminals. The demodulators 13 each may be composed of an RF demodulator for frequency shifting the received RF signal into the baseband signal and a baseband demodulator for demodulating the baseband signal into the original signal by despreading it. Signal power measurement parts 15 measure the signal quality such as the RSSI, the SIR and the BER by analyzing the power of the signals output from the demodulators 13. Power control bit (PCB) generators 17 generate power control bits according to the power measurement results.

A reverse power controller 100 generates power control signals for controlling the transmission power of the terminals by analyzing the power control bits output from the PCB generators 17. As the result of the analysis, when a power increase command is equal to or higher than a predetermined value, the reverse power controller 100 generates the power control signals for reducing the transmission power of all the terminals. That is to say, when it is determined that the system condition will be improved by decreasing the transmission power of the terminals reversely rather than increasing the transmission power, the reverse power controller 100 commands the terminals within the coverage of the base station to decrease the transmission power. Exclusive OR gates 31 generate power control commands by exclusively ORing the outputs of the PCB generators 17 and the outputs of the reverse power controller 100.

Baseband signal processors 41 process transmission data to be transmitted to the respective terminals from the base station. PCB multiplexers 33 multiplex the power control bits to the transmission signals output from the baseband signal processors 41. Modulators 35 modulate the transmission signals with the power control bits, output from the PCB multiplexers 33, into the RF signals. A summer 37 sums the transmission signals output from the modulators 35. An RF signal processor 39 converts the transmission signal output from the summer 37 into the RF transmission signal.

Figure 2:
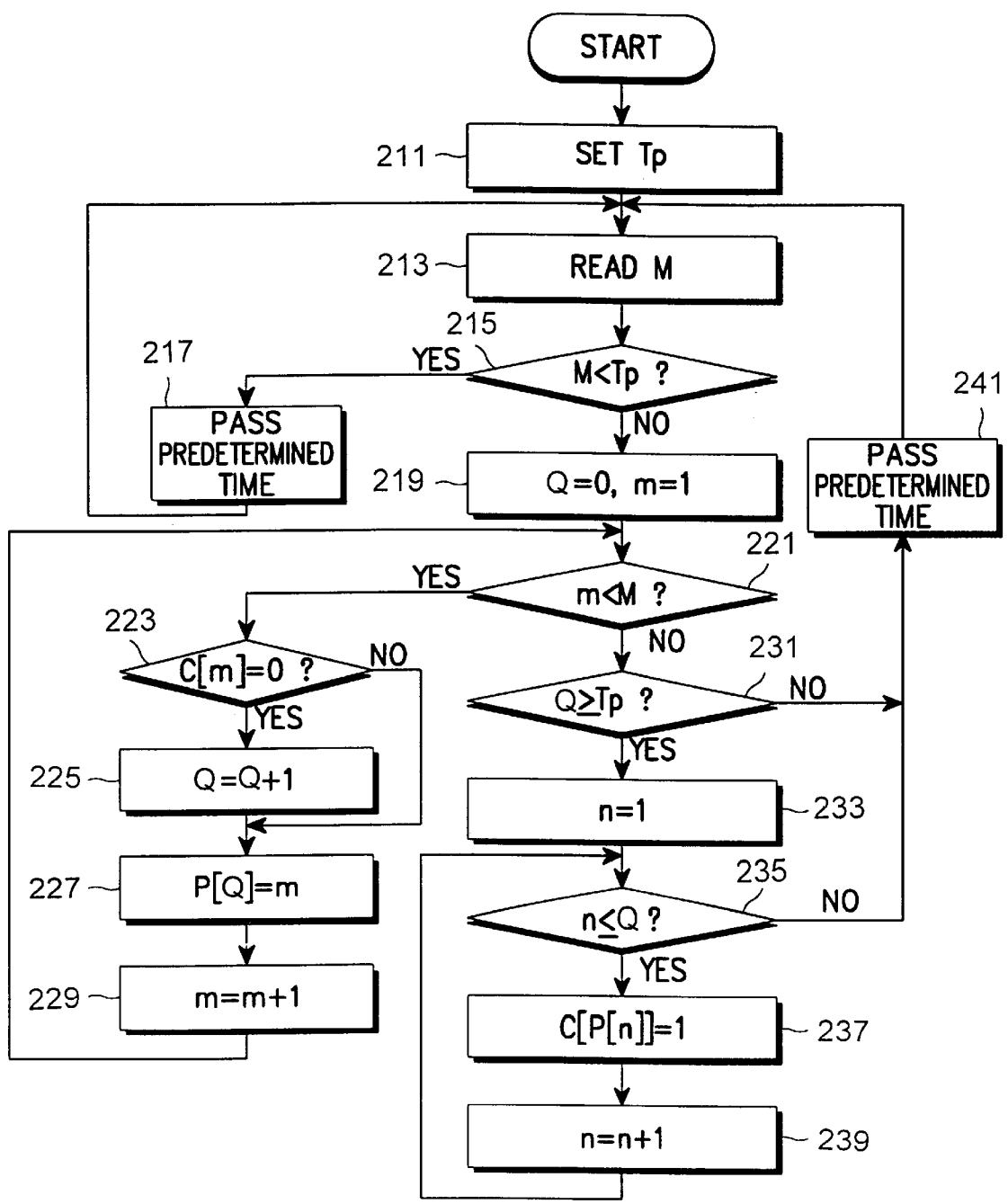
FIG. 2 is a flow chart illustrating a method for controlling the transmission power of the terminals by means of the base station according to a first embodiment of the present invention.

In FIG. 1, the reverse power controller 100 each include a controller for processing the control program of FIG. 2, and a memory for storing the control program and data generated during execution of the control program.

Figure 3:
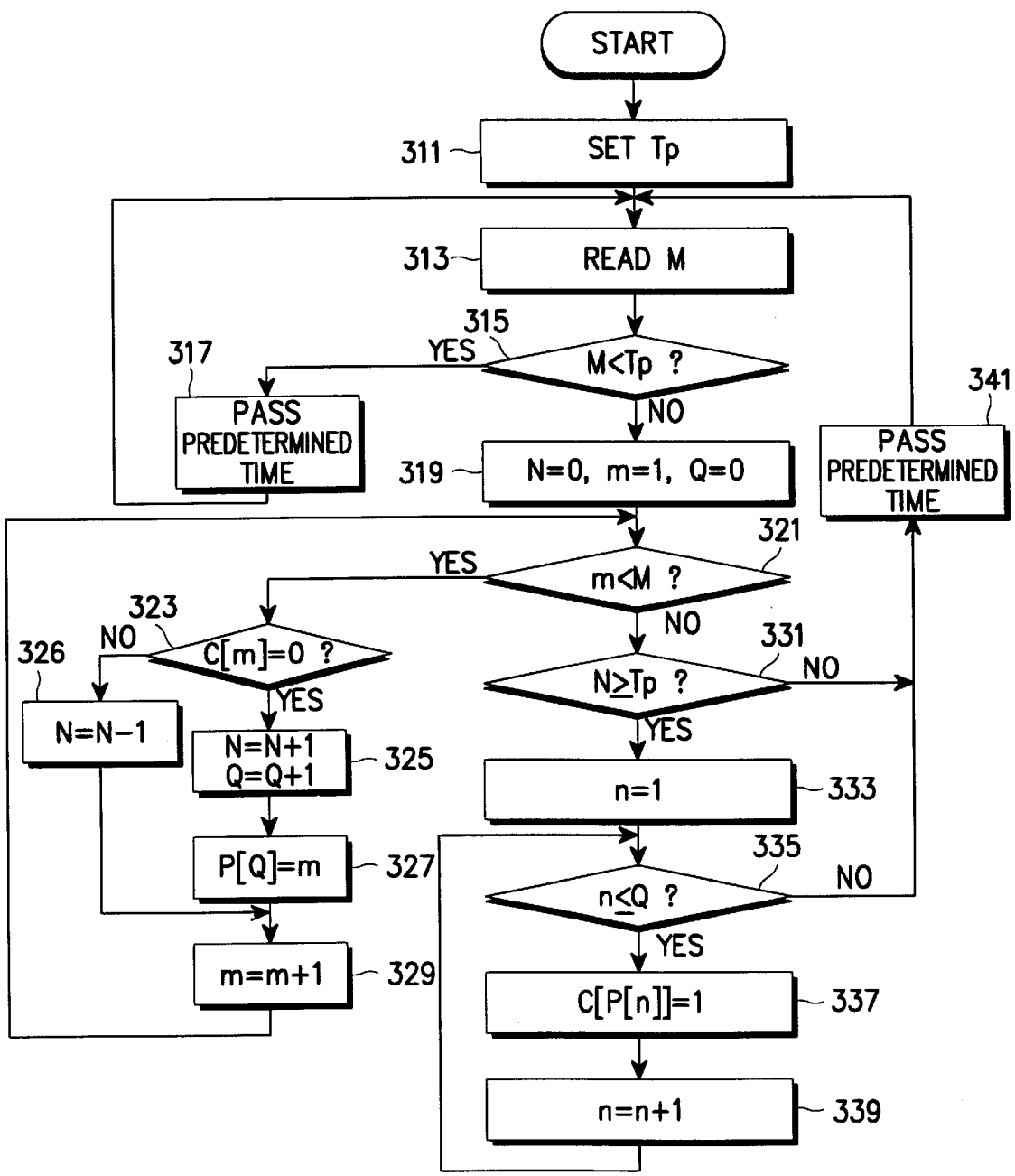
FIG. 3 is a flow chart illustrating a method for controlling the transmission power of the terminals by means of the base station according to a second embodiment of the present invention.
Figure 4:
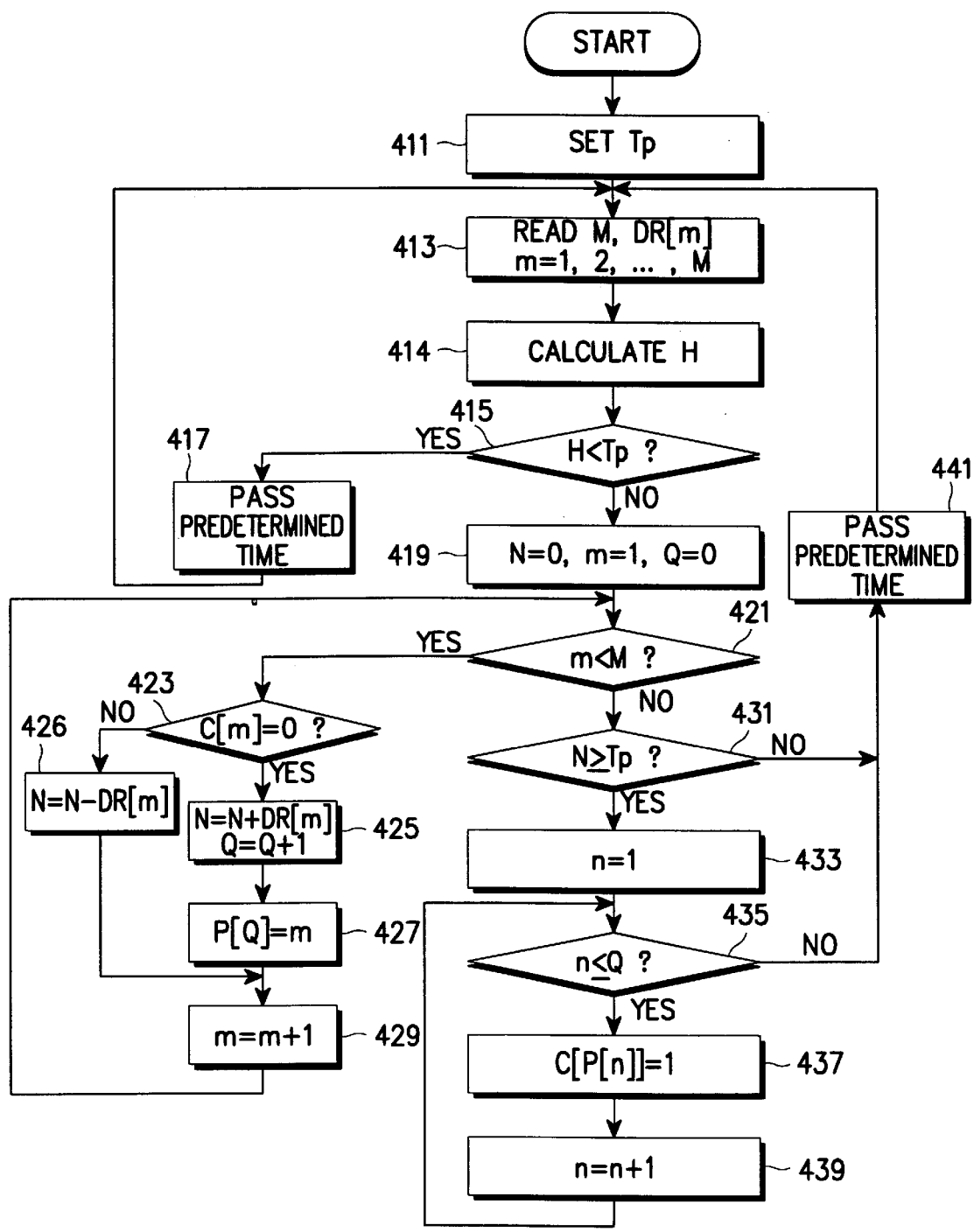
FIG. 4 is a flow chart illustrating a method for controlling the transmission power of the terminals by means of the base station according to a third embodiment of the present invention.

FIG. 2 is a flow chart of the reverse power controller 100 for controlling transmission power of the terminals. In FIGS. 2 to 4, m denotes a terminal number in service, $T_p$ the threshold value for the effective number of channels for the reverse power control, N the effective number of the channels requiring the increase the transmission power, Q the number of the terminals to be commanded to increase the transmission power, M the number of terminals currently in service, H the effective number of the channels in service calculated based on a fundamental channel, and C[m] a power control command to the terminals. For instance, with C[m]=0, the base station commands the terminal m to increase the transmission power, and when C[m]=1, the base station commands the terminal m to decrease the transmission power. Further, DR[m] denotes a transmission data rate of the terminal m or a function of the transmission data rate (where m=1,2, . . . , M). In case all the terminals perform the same service with the same data rate by single coding, the number of the channels is equal to the number of the terminals. However, the effective number of the channels depends on the demanded service quality. For example, in case the same bit energy-to-interference ratio is demanded, to service 64 Kbps data by the single code needs the channels approximately twice as many as the channels required when servicing 32 Kbps data by the single code. Thus, though the number of the physical channels is identical, the effective number of the channels may be different. For the double bit energy-to-reference ratio (3 bB), the double transmission power is needed, so that the effective number of the channels should be twice as many as the number of the channels needed for the lower bit energy-to-interference ratio.

In the specification, it is assumed that all the terminals perform the same service with the same data rate by the single coding, and the effective number H of the channels in service is equal to the number M of the terminals.

Referring to FIG. 2, the reverse power controller 100 of the base station sets the threshold value $T_p$ for the reverse power control in step 211, reads the number M of the terminal currently in service in step 213, and compares the number M with the threshold value $T_p$ in step 215. Here, the number M includes all the terminals currently in service which are to be commanded to increase or decrease the transmission power. If the number M is smaller than the threshold value $T_p$, the base station passes a predetermined time in step 217. After the passage of the predetermined time, the base station returns to the step 213.

On the other hand, if it is determined in step 215 that the number M is equal to or greater than the threshold value $T_p(M \geq T_p)$, the base station initializes in step 219 the effective number Q of the terminals to be commanded to increase the transmission power to "0" and the terminal number m to "1", respectively.

Subsequently, in steps 221 to 229, the base station sequentially examines all the terminals in service to determine the power control commands C[m] for the respective terminals. Specifically, in step 221, the base station checks if the present terminal number m is the last terminal number (m=M). That is, the base station checks in the step 221 if the present terminal number m is smaller than the number M of the terminals in service. If m<M, the base station checks whether C[m]=0 in step 223. Here, with C[m]=0, the base station commands the terminal m to increase the transmission power, whereas with C[m]=1, the base station commands the terminal m to decrease the transmission power. If C[m]=0 in the step 223, the base station increases by one the number Q of the terminals to be commanded to increase the transmission power in step 225 (Q=Q+1) and stores the terminal number m in an Q-th storage area P[Q] in step 227. Thereafter, the base station increases the terminal number m by one in step 229 (m=m+1) and returns to the step 221.

By repeating the above steps, the base station examines the power control commands C[m] for the respective terminals in service, and stores the terminal number for the terminals to be commanded to increase the transmission power. Further, the base station accumulates the effective number Q of the terminals to be commanded to increase the transmission power.

In the meantime, if it is determined in step 221 that the present terminal number m is the last channel number (m=M), the base station compares in step 231 the number Q of the terminals to be commanded to increase the transmission power with the threshold value $T_p$. If the number Q is smaller than the threshold value $T_p$, there is no need to control the transmission power reversely. Hence, the base station proceeds to step 241 to pass a predetermined time and then returns to the step 213.

However, if the number Q of the terminals to be commanded to increase the transmission power is equal to or greater than the threshold value $T_p(Q \geq T_p)$, the base station controls the transmission power reversely. To the end, in step 233, the base station initializes to 1 a channel number n for the present channel to be power-controlled reversely and checks in step 235 if the channel number n is equal to or smaller than the number Q (n≦Q). Here, n denotes an address of the table for storing the channel number for the terminal to undergo the reverse power control. That is, in the step 235, the base station determines whether the reverse power control is completed for all the terminals requiring the reverse power control.

If it is determined in step 235 that n≦Q, the base station commands in step 237 the terminal corresponding to the terminal number n to decrease the transmission power (by transmitting a power control command of C[P[n]]=1) to perform the reverse power control. In step 239, the base station increases the address n of the table, in which the terminal numbers for the terminals requiring the reverse power control are stored, by one (n=n+1) to control the reverse power of the next terminal and then returns to the step 235. Such a reverse power control operation is repeated until n>Q.

Referring to FIG. 3, the reverse power controller 100 of the base station sets the threshold value $T_p$ for the reverse power control in step 311, reads the number M of the terminals currently in service in step 313, and compares the number M with the threshold value $T_p$ in step 315. Here, the number M includes all the terminals currently in service which are to be commanded to increase or decrease the transmission power. If the number M is smaller than the threshold value $T_p$, the base station passes a predetermined time in step 317. After the passage of the predetermined time, the base station returns to the step 313.

On the other hand, if it is determined in step 315 that the number M is equal to or greater than the threshold value $T_p(M≧T_p)$, the base station initializes in step 319 the effective number N of the channels to be commanded to increase the s transmission power to "0", the number Q of the terminals to be commanded to increase the transmission power to "0" and the terminal number m to "1", respectively.

Subsequently, in steps 321 to 329, the base station sequentially examines all the channels in service to determine the power control commands C[m] for the respective channels. Specifically, in step 321, the base station checks if the present terminal number m is the last terminal number (m=M). That is, the base station checks in the step 321 if the present terminal number m is smaller than the number M of the terminals in service. If m<M, the base station checks whether C[m]=0 in step 323. Here, with C[m]=0, the base station commands the terminal m to increase the transmission power, whereas with C[m]=1, the base station commands the terminal m to decrease the transmission power. If C[m]=0 in the step 323, the base station increases by one the effective number N of the channels to be commanded to increase the transmission power (N=N+1) and also increase by one the number Q of the terminals to be commanded to increase the transmission power (Q=Q+1), in step 325. Then, in step 327, the base station stores the terminal number m in a Q-th storage area P[Q]. If C[m]=1 in the step 323, the base station decreases by one the effective number N of the channels to be commanded to increase the transmission power in step 326 (N=N−1). Thereafter, the base station increases the terminal number m by one in step 329 (m=m+1) and returns to the step 321.

By repeating the above steps, the base station examines the power control commands C[m] for the respective terminals in service, and stores the terminal number for the terminals to be commanded to increase the transmission power. Further, the base station accumulates the effective number N of the channels to be commanded to increase the transmission power.

In the meantime, if it is determined in step 321 that the present terminal number m is the last channel number (m=M), the base station compares in step 331 the effective number N of the channels to be commanded to increase the transmission power with the threshold value $T_p$. If the number N is smaller than the threshold value $T_p$, there is no need to control the transmission power reversely. Hence, the base station proceeds to step 341 to pass a predetermined time and then returns to the step 313.

However, if the number N of the channels to be commanded to increase the transmission power is equal to or greater than the threshold value $T_p(N≧T_p)$, the base station controls the transmission power reversely. To the end, in step 333, the base station initializes to 1 a terminal number n for the terminal undergoing the reverse power control and checks in step 335 if the channel number n is equal to or smaller than the number Q (n≦Q). That is, in the step 335, the base station determines whether the reverse power control is completed for all the terminals requiring the reverse power control.

If it is determined in step 335 that n≦Q, the base station commands in step 337 the terminal corresponding to the terminal number n to decrease the transmission power (by transmitting a power control command C[P[n]]=1) to perform the reverse power control. In step 339, the base station increases the address n of the table, in which the terminal numbers for the terminals requiring the reverse power control are stored, by one (n=n+1) to control the reverse power of the next terminal and then returns to the step 335. Such a reverse power control operation is repeated until n>Q.

Referring to FIG. 4, the reverse power controller 100 of the base station sets the threshold value $T_p$ for the reverse power control in step 411, reads the number M of the terminals currently in service and the transmission data rate DR[m] (where m=1,2,3, . . . , M) in step 413, calculates a valid number H of effective channels in service on basis of the value and quality of service required in step 414, and compares the number H with the threshold value $T_p$ in step 415. Here, the number M includes all the terminals currently in service which are to be commanded to increase or decrease the transmission power. If the number H is smaller than the threshold value $T_p$ the base station passes a predetermined time in step 417. After the passage of the predetermined time, the base station returns to the step 413.

On the other hand, if it is determined in step 415 that the number H is equal to or greater than the threshold value $T_p(H≧T_p)$, the base station initializes in step 419 the effective number N of the channels to be commanded to increase the transmission power to "0", the number Q of the terminals to be commanded to increase the transmission power to "0" and the terminal number m to "1", respectively.

Subsequently, in steps 421 to 429, the base station sequentially examines all the channels in service to determine the power control commands C[m] for the respective channels. Specifically, in step 421, the base station checks if the present terminal number m is the last terminal number (m=M). That is, the base station checks in the step 421 if the present terminal number m is smaller than the number M of the terminals in service. If m<M, the base station checks whether C[m]=0 in step 423. Here, with C[m]=0, the base station commands the terminal m to increase the transmission power, whereas with C[m]=1, the base station commands the terminal m to decrease the transmission power. If C[m]=0 in the step 423, the base station increases the effective number N of the channels to be commanded to increase the transmission power by the transmission data rate DR[m] of the corresponding terminal (N=N+DR[m]) and also increase by one the number Q of the terminals to be commanded to increase the transmission power (Q=Q+1), in step 425. Then, in step 427, the base station stores the terminal number m in the Q-th storage area P[Q]. If C[m]=1 in the step 423, the base station decreases the effective number N of the channels to be commanded to increase the transmission power by the transmission data rate DR[m] of the corresponding terminal in step 426 (N=N−DR[m]). Thereafter, the base station increases the terminal number m by one in step 429 (m=m+1) and returns to the step 421.

By repeating the above steps, the base station examines the power control commands C[m] for the respective terminals in service and stores the terminal number of the terminals needed to increase the transmission power. Further, the base station accumulates the effective number N of the channels to be commanded to increase the transmission power.

In the meantime, if it is determined in step 421 that the present terminal number m is the last channel number (m=M), the base station compares in step 431 the effective number N of the channels to be commanded to increase the transmission power with the threshold value $T_p$. If the number N is smaller than the threshold value $T_p$, there is no need to control the transmission power reversely. Hence, the base station proceeds to step 441 to pass a predetermined time and then returns to the step 413.

However, if the number N of the channels to be commanded to increase the transmission power is equal to or greater than the threshold value $T_p$ (N≧$T_p$), the base station controls the transmission power reversely. To the end, in step 433, the base station initializes to 1 the terminal number n for the terminal undergoing the reverse power control and checks in step 435 if the channel number n is equal to or smaller than the number Q (n≦Q). That is, in the step 435, the base station determines whether the reverse power control is completed for all the terminals requiring the reverse power control.

If it is determined in step 435 that n≦Q, the base station commands in step 437 the terminal corresponding to the terminal number n to decrease the transmission power (by transmitting a power control command C[P[n]]=1) to perform the reverse power control. In step 439, the base station increases the address n of the table by one (n=n+1) to control the reverse power of the next terminal and then returns to the step 435. Such a reverse power control operation is repeated until n>Q.

In summary, the base station measures the strength and the bit error rate of the signals received from the terminals and increases the transmission power of the terminals if the strength and the bit error rate do not reach a desired level. Here, in the case the terminals require the reduction in the transmission power, the base station commands the terminals to reduce the transmission power. However, in the case the terminals require the increase in the transmission power, the base station determines the number of the terminals requiring the increase in the transmission power and compares the determined number with the threshold value. If the determined number is smaller than the threshold value, the base station commands the terminals to increase the transmission power. However, if the determined number is equal to or larger than the threshold value, the base station commands the terminals to decrease the transmission power. In this manner, the base station can prevent interference between the adjacent terminals, and the terminals can extend a run-time of the battery.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A device for controlling transmission power of terminals operating within a base station of a mobile communication system, comprising:

a plurality of power control bit (PCB) generators for generating power control commands by analyzing transmission signals received from the terminals over respective channels;

a reverse power controller for comparing said power control commands with a threshold value for reverse power control, comparing effective number of channels requiring increase in transmission power with said threshold value, and commanding at least one terminal to decrease the transmission power reversely when the number of channels requiring the increase in the transmission power is greater than the threshold value, said at least one commanded terminal being a terminal that previously increased its transmission power; and a plurality of multiplexers for generating transmission signals by multiplexing outputs of said reverse power controller and transmission signals of the base station.

2. The device as claimed in claim 1, said device further comprising:

a plurality of comparators for comparing outputs of the reverse power controller with outputs of said power control command generators.

3. The device as claimed in claim 2, wherein said comparators are exclusive OR gates.

4. A reverse power control method for controlling transmission power of mobile units from a base station of a mobile communication system, comprising the steps of:

generating power control commands corresponding to the mobile units by analyzing signals transmitted from the mobile units;

determining whether the number of power increasing commands in the generated power control commands is greater than a threshold value or not; and commanding the plurality of mobile units to reduce transmission power if the number of power increase commands in the generated power control commands is greater than the threshold value.

5. The reverse power control method as claimed in claim 4, wherein said base station commands the corresponding mobile units to decrease transmission power when a number of channels to be commanded to increase transmission power is equal to or greater than a predetermined value.

6. A reverse power control method for allowing a base station to control transmission power of mobile units in a mobile communications system, comprising the steps of:

setting a threshold value for a reverse power control;

calculating a valid number of channels in service;

comparing the number of channels in service with the threshold value at regular intervals;

sequentially checking whether the channels in service require increasing the transmission power if the number of channels in service is equal to or greater than the threshold value, and storing channel numbers for the channels which require increasing the transmission power; and transmitting a power decrease command to the mobile units if the number of channels which require increasing transmission power is equal to or greater than the threshold.

7. The reverse power control method as claimed in claim 6, wherein said threshold value corresponds to a power level.

8. A reverse power control method for controlling transmission power of mobile units from a base station of a CDMA (Code Division Multiple Access) mobile communication system, comprising the steps of:

generating power control commands of the mobile units by analyzing signals transmitted from the mobile units;

determining whether, if a plurality of mobile units which were commanded to increase transmission power were rather commanded to decrease transmission power, a condition of the entire system would improve; and commanding the plurality of mobile units to reduce transmission power if it is determined that decreasing transmission power rather than increasing transmission power improves a condition of the entire system.

9. The method of claim 8, wherein the condition of the entire system is an amount of interference between coded signals transmitted by the mobile units.

10. A reverse power control method for controlling transmission power of mobile units from a base station of a mobile communication system, comprising the steps of:

receiving signals transmitted from the mobile units;

generating power control commands for the mobile units based on the received signals transmitted from the mobile units;

determining whether a number of channels commanded to increase transmission power is equal to or greater than a predetermined value; and commanding mobile units with channels commanded to increase transmission power to reduce transmission power if the number of channels to be commanded to increase transmission power is equal to or greater than a predetermined value.

11. A reverse power control method for controlling transmission power of mobile units from a base station of a mobile communication system, comprising the steps of:

receiving signals transmitted from the mobile units;

generating power control commands for the mobile units based on the received signals transmitted from the mobile units;

determining whether an effective number of channels commanded to increase transmission power is greater than a predetermined value; and commanding mobile units with channels commanded to increase transmission power to reduce transmission power if the effective number of channels to be commanded to increase transmission power is greater than a predetermined value.

* * * * *